United States Patent
Lin et al.

(10) Patent No.: US 11,877,283 B2
(45) Date of Patent: Jan. 16, 2024

(54) TERMINAL DEVICE, BASE STATION DEVICE, AND METHOD

(71) Applicants: SHARP KABUSHIKI KAISHA, Sakai (JP); FG Innovation Company Limited, Tuen Mun (HK)

(72) Inventors: Huifa Lin, Sakai (JP); Shoichi Suzuki, Sakai (JP); Tomoki Yoshimura, Sakai (JP); Taewoo Lee, Sakai (JP); Wataru Ouchi, Sakai (JP); Toshizo Nogami, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 371 days.

(21) Appl. No.: 17/277,451

(22) PCT Filed: Sep. 18, 2019

(86) PCT No.: PCT/JP2019/036555
§ 371 (c)(1),
(2) Date: Mar. 18, 2021

(87) PCT Pub. No.: WO2020/059750
PCT Pub. Date: Mar. 26, 2020

(65) Prior Publication Data
US 2021/0352699 A1 Nov. 11, 2021

(30) Foreign Application Priority Data
Sep. 19, 2018 (JP) .................. 2018-174702

(51) Int. Cl.
*H04W 72/20* (2023.01)
*H04W 72/1263* (2023.01)
*H04W 72/23* (2023.01)

(52) U.S. Cl.
CPC ....... *H04W 72/20* (2023.01); *H04W 72/1263* (2013.01); *H04W 72/23* (2023.01)

(58) Field of Classification Search
CPC . H04W 72/20; H04W 72/1263; H04W 72/23; H04W 72/21; H04W 24/10;
(Continued)

(56) References Cited

U.S. PATENT DOCUMENTS

2017/0366377 A1   12/2017  Papasakellariou
2020/0280996 A1*   9/2020  Yang .................... H04B 7/0626
(Continued)

FOREIGN PATENT DOCUMENTS

CN    102884742 A    1/2013
CN    107710804 A    2/2018
(Continued)

OTHER PUBLICATIONS

Catt, "Remaining aspects of UCI multiplexing on PUSCH", R1-1807355, 3GPP TSG RAN WG1 Meeting #92bis, Sanya, China, Apr. 16-20, 2018, p. 5, first paragraph.
(Continued)

*Primary Examiner* — Ricky Q Ngo
*Assistant Examiner* — Kabir U Jahangir
(74) *Attorney, Agent, or Firm* — ScienBiziP, P.C.

(57) ABSTRACT

A terminal device for performing communication method, the terminal device comprising a receiver for receiving a PDCCH having a first DCI format; and a transmitter for transmitting a PUCCH including UCI, and a PUSCH. The transmitter multiplexes the UCI onto a first PUSCH dynamically scheduled via the first DCI format when the PUCCH conflicts with a first plurality of PUSCHs including the first PUSCH and a second PUSCH for semi-permanently trans-
(Continued)

mitted CSI, and multiplexes the UCI onto a third PUSCH for aperiodically transmitted CSI when the PUCCH conflicts with the third PUSCH.

12 Claims, 6 Drawing Sheets

(58) Field of Classification Search
CPC .......... H04W 72/1268; H04L 27/2602; H04L 5/001; H04L 5/0048; H04L 5/0051; H04L 5/0057; H04L 5/0094; H04L 5/0044; H04B 7/0626
See application file for complete search history.

(56) References Cited

U.S. PATENT DOCUMENTS

| | | | | |
|---|---|---|---|---|
| 2020/0351867 | A1* | 11/2020 | Guo | H04L 5/0051 |
| 2021/0045143 | A1* | 2/2021 | Ji | H04L 5/0087 |
| 2021/0144702 | A1* | 5/2021 | Zhao | H04W 72/21 |
| 2021/0352655 | A1* | 11/2021 | Xiong | H04L 5/0012 |

FOREIGN PATENT DOCUMENTS

| | | |
|---|---|---|
| EP | 3355608 A1 | 8/2018 |
| JP | 2018-42001 A | 3/2018 |
| JP | 2021503249 A | 2/2021 |
| KR | 2018/013997 | 5/2019 |

OTHER PUBLICATIONS

Catt, "Remaining details of UCI multiplexing on PUSCH", R1-1801733, 3GPP TSG RAN WG1 Meeting #92, Athens, Greece, Feb. 26-Mar. 2, 2018.
Ericsson, On semi-persistent CSI reporting on PUSCH[on line], 3GPP TSG RAN WG1 #90, R1-1714288, Prague, Czech Republic, Aug. 25, 2017.
Oppo, Discussion on PUCCH partial overlap[on line], 3GPP TSG RAN WG1 #93, R1-1806836, Busan, Korea, May 25, 2018.
NTT Docomo, "New SID proposal: Study on New Radio Access Technology", RP-160671, 3GPP TSG RAN Meeting #71, Goteborg, Sweden, Mar. 7-10, 2016.
Catt, "Corrections to UCI feedback procedures" [online], 3GPP TSG RAN WG1 #94 R1-1809713, Aug. 24, 2018, pp. 15-16.
NTT Docomo, "Maintenance for CSI acquisition"[online], 3GPP TSG RAN WG1 #94 R1-1809137, Aug. 24, 2018, section 2.

* cited by examiner

Fig. 2A : Table of number of OFDM symbols per slot $N^{symb,\mu}_{slot}$ for subcarrier spacing configuration $\mu$ and normal cyclic prefix

| | | slot_configuration | | | | | |
|---|---|---|---|---|---|---|---|
| | | 0 | | | 1 | | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Fig. 2B : Table of number of OFDM symbols per slot $N^{symb,\mu}_{slot}$ for subcarrier spacing configuration $\mu$ and extended cyclic prefix

| | | slot_configuration | | | | | |
|---|---|---|---|---|---|---|---|
| | | 0 | | | 1 | | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

Fig. 2

TERMINAL DEVICE, BASE STATION DEVICE, AND METHOD

FIELD

The present disclosure relates to a terminal device, base station device and methods thereof. The present disclosure claims the benefit of and priority to Japanese Patent Application No. 2018-174702 ("the '702 application"), filed on Sep. 19, 2018. The content(s) of the '702 application are fully incorporated herein by reference for all purposes.

BACKGROUND

In the third generation partnership project (3rd Generation Partnership Project: 3GPP), the radio access methods and radio networks of cellular mobile communications (hereinafter, referred to as "LTE (Long Term Evolution)" or "Evolved Universal Terrestrial Radio Access (EUTRA)") is being considered. In LTE, a base station device is also called an eNodeB (evolved NodeB), and a terminal device is also called a UE (User Equipment). LTE is a cellular communications system using a plurality of coverage areas of a base station device configured in a cell. A single base station device may also manage a plurality of serving cells.

For 3GPP, in order to propose in the IMT (International Mobile Telecommunication)-2020 which is a standard of the next generation mobile communications system specified by the International Telecommunication Union (ITU), the next generation standard (NR (New Radio)) is studied (Non-Patent Literature 1). It is required in a single technology framework that NR satisfies requirements in the following three assumption scenarios, eMBB (enhanced Mobile Broadband), mMTC (massive Machine Type Communication), and URLLC (Ultra Reliable and Low Latency Communication).

PRIOR ART DOCUMENTS

Non-Patent Literature

Non-Patent Literature 1: "New SID proposal: Study on New Radio Access Technology," RP-160671, NTT docomo, 3GPP TSG RAN Meeting #71, Goteborg, Sweden, 7-10 Mar. 2016.

SUMMARY

Problems to be Addressed

The present disclosure provides a terminal device that performs communications efficiently, a communication method used for the terminal device, a base station device that performs communications efficiently, and a communication method used for the base station device.

Aspects to Address the Problems

A first aspect of the present disclosure is a terminal device for performing a communication method, the terminal device comprising: a receiver for receiving a Physical Downlink Control Channel (PDCCH) having a first Downlink Control Information (DCI) format; and a transmitter for transmitting a Physical Uplink Control Channel (PUCCH) including Uplink Control Information (UCI), and a Physical Uplink Shared Channel (PUSCH), wherein the transmitter multiplexes the UCI onto a first PUSCH dynamically scheduled via the first DCI format when the PUCCH conflicts with a first plurality of PUSCHs including the first PUSCH and a second PUSCH for semi-permanently transmitted Channel State Information (CSI), and multiplexes the UCI onto a third PUSCH for aperiodically transmitted CSI when the PUCCH conflicts with the third PUSCH.

A second aspect of the present disclosure is a base station device for performing a communication method, the base station device comprising: a transmitter for transmitting a Physical Downlink Control Channel (PDCCH) having a first Downlink Control Information (DCI) format; and a receiver for receiving a Physical Uplink Control Channel (PUCCH) including Uplink Control Information (UCI), and a Physical Uplink Shared Channel (PUSCH), wherein the receiver multiplexes the UCI onto a first PUSCH dynamically scheduled via the first DCI format when the PUCCH conflicts with a first plurality of PUSCHs including the first PUSCH and a second PUSCH for semi-permanently transmitted Channel State Information (CSI), and multiplexes the UCI onto a third PUSCH for aperiodically transmitted CSI when the PUCCH conflicts with the third PUSCH.

A third aspect of the present disclosure is a communication method for a terminal device, the method comprising: receiving a (Physical Downlink Control Channel PDCCH) having a first Downlink Control Information (DCI) format; multiplexing Uplink Control Information (UCI) onto a first Physical Uplink Shared Channel (PUSCH) dynamically scheduled via the first DCI format when a Physical Uplink Control Channel (PUCCH) conflicts with a first plurality of PUSCHs including the first PUSCH and a second PUSCH for semi-permanently transmitted Channel State Information (CSI); and multiplexing the UCI onto a third PUSCH for aperiodically transmitted CSI when the PUCCH conflicts with the third PUSCH.

Effects

According to the present disclosure, the terminal device is able to perform communications efficiently. Furthermore, the base station device is able to perform communications efficiently.

BRIEF DESCRIPTION OF THE DRAWINGS

FIG. 2 illustrates a relationship between Nslotsymb, subcarrier spacing configuration μ, slot configuration and CP configuration according to the present disclosure.

DESCRIPTION

Hereinafter, the implementations of the present disclosure will be disclosed.

A parameter or information indicating one or more values may also include at least the parameter or information indicating the one or more values. A higher layer parameter may be a single higher layer parameter. The higher layer parameter may be an information element (IE) including a plurality of parameters.

Figure 1:
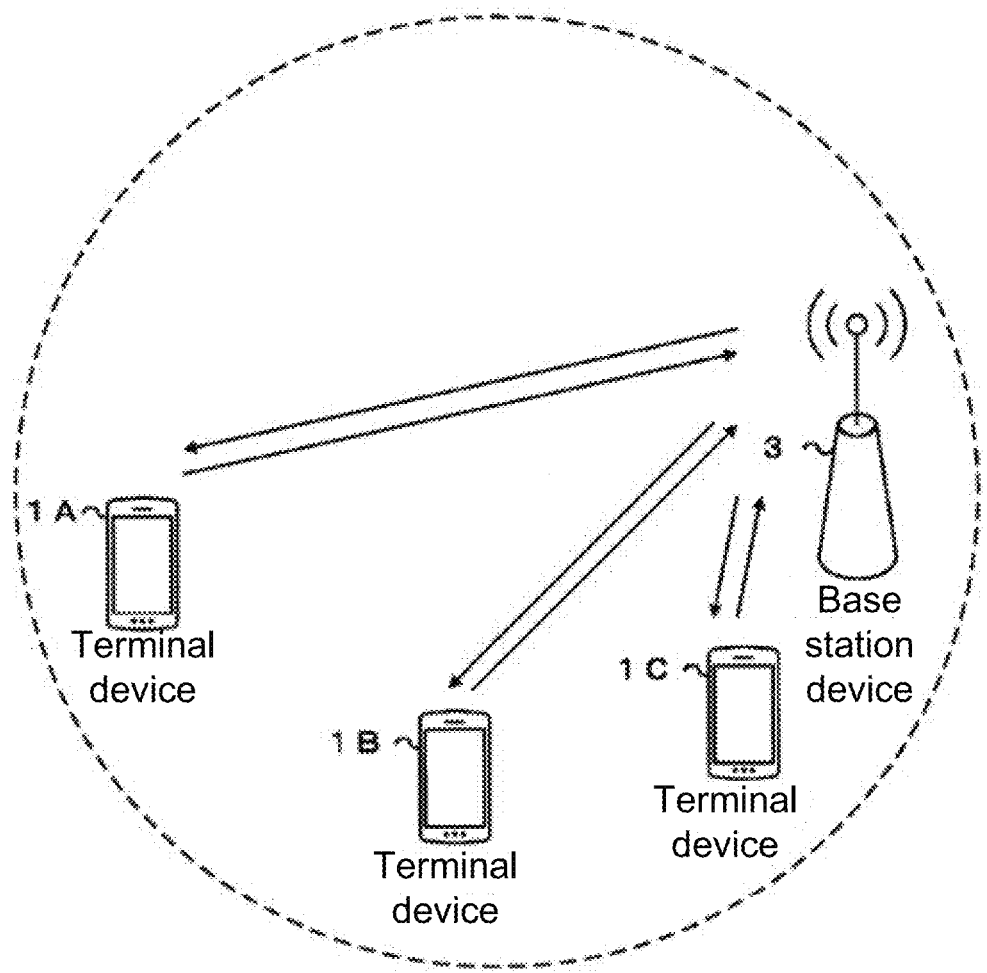
FIG. 1 is a schematic diagram of a radio communications system according to the present disclosure.

FIG. 1 is a schematic diagram of a radio communications system according to the present disclosure. In FIG. 1, the radio communications system includes terminal devices 1A to 1C and a base station device 3. Hereinafter, the terminal devices 1A to 1C are also referred to as a terminal device 1.

The base station device 3 may include one or both of an MCG (Master Cell Group) and an SCG (Secondary Cell Group). The MCG is a group of serving cells including at least a PCell (Primary Cell). The SCG is a group of serving cells including at least a PSCell (Primary Secondary Cell). The PCell may be a serving cell provided based on an initial connection. The MCG may include one or more SCells (Secondary Cells). The SCG may include one or more SCells. The serving cell identity is a short identity for identifying a serving cell. The serving cell identity may be provided by a higher layer parameter.

Hereinafter, the frame configuration will be described.

In the radio communications system according to the present disclosure, at least OFDM (Orthogonal Frequency Division Multiplex) is used. An OFDM symbol is a unit of the OFDM time domain. An OFDM symbol includes at least one or more subcarriers. An OFDM symbol may also be converted to a time-continuous signal in generating a baseband signal.

Subcarrier spacing (SCS) may be obtained by a subcarrier spacing according to $\Delta f = 2^\mu \cdot 15$ kHz, where $\Delta f$ is the SCS. For example, the subcarrier spacing configuration $\mu$ may be set to any one of 0, 1, 2, 3, 4, and/or 5. The subcarrier spacing configuration $\mu$ may also be provided by a higher layer parameter for a certain BWP (BandWidth Part).

In the radio communications system according to the present disclosure, a time unit $T_C$ is used to represent the length in the time domain. The time unit $T_C$ may be obtained by $T_C = 1/(\Delta f_{max} \cdot N_f)$. $\Delta f_{max}$ may be the maximum value of the subcarrier spacing supported in the radio communications system according to the present disclosure. $\Delta f_{max}$ may be $\Delta f_{max} = 480$ kHz. $N_f$ may be $N_f = 4096$. The constant $\kappa$ is $\kappa = \Delta f_{max} \cdot N_f/(\Delta f_{ref} N_{f, ref}) = 64$. $\Delta f_{ref}$ may be 15 kHz. $N_{f, ref}$ may be 2048.

The constant $\kappa$ may be a value indicating the relationship between the reference subcarrier spacing and $T_C$. The constant $\kappa$ may also be used for subframe length. The number of slots included in a subframe may be obtained based on at least the constant $\kappa$. $\Delta f_{ref}$ is a reference subcarrier spacing, and $N_{f, ref}$ is a value corresponding to the reference subcarrier spacing.

The downlink transmission and/or the uplink transmission is composed of 10 ms frame(s). A frame is configured to include 10 subframes. The length of the subframe is 1 ms. The length of the frame may be obtained regardless of the subcarrier spacing $\Delta f$. In other words, the frame configuration may be obtained regardless of $\mu$. The length of the subframe may be obtained regardless of the subcarrier spacing $\Delta f$. In other words, the subframe configuration may be obtained regardless of $\mu$.

The number and index of slots included in a subframe may be obtained for the configuration $\mu$ of a certain subcarrier spacing. For example, the first slot number $n^\mu$ may be obtained in ascending order in the range of 0 to $N^{subframe, \mu}_{slot} - 1$. The number and index of the slots included in the frame may be obtained for the subcarrier spacing configuration $\mu$. For example, the second slot number $n^\mu_{s, f}$ may be obtained in ascending order in the range of 0 to $N^{frame, \mu}_{slot} - 1$ in the frame. Consecutive $N^{slot}_{symb}$ OFDM symbols may be included in one slot. $N^{slot}_{symb}$ may be obtained based on at least a part or all of the slot configuration and/or the CP (Cyclic Prefix) configuration. The slot configuration may be obtained by at least a higher layer parameter tdd-UL-DL-ConfigurationCommon. The CP configuration may be obtained based on at least higher layer parameters. The CP configuration may be obtained based on at least dedicated RRC signaling. The first slot number and the second slot number may also be referred to a slot number (slot index).

FIG. 2 illustrates a relationship between $N^{slot}_{symb}$, subcarrier spacing configuration $\mu$, slot configuration and CP configuration according to the present disclosure. In FIG. 2A, when the slot configuration is 0, the subcarrier spacing configuration $\mu$ is 2, and the CP configuration is a normal CP, $N^{slot}_{symb} = 14$, $N^{frame, \mu}_{slot} = 40$, $N^{subframe, \mu}_{slot} = 4$. Furthermore, in FIG. 2B, when the slot configuration is 0, the subcarrier spacing configuration $\mu$ is 2, and the CP configuration is an extended CP, $N^{slot}_{symb} = 12$, $N^{frame, \mu}_{slot} = 40$, $N^{subframe, \mu}_{slot} = 4$. The $N^{slot}_{symb}$ when the slot configuration is 0 may correspond to double the $N^{slot}_{symb}$ when the slot configuration is 1.

Hereinafter, the physical resources will be described.

An antenna port may be defined by a channel on which a symbol transmitted at one antenna port can be estimated according to the channel on which other symbols are transmitted at the same antenna port. If a large-scale property of a channel on which a symbol is transmitted at one antenna port can be estimated according to the channel on which a symbol is transmitted at another antenna port, the two antenna ports are referred to as QCL (Quasi Co-Located). The large-scale property may include at least the long-interval property of a channel. The large-scale property may also include a part or all of a delay spread, a Doppler spread, a Doppler shift, an average gain, an average delay, and beam parameters (spatialDxparameters). For beam parameters, the first antenna port and the second antenna port being QCL may also indicate that the receiving beam assumed by the receiving side corresponding to the first antenna port and the receiving beam assumed by the receiving side corresponding to the second antenna port are the same. For beam parameters, the first antenna port and the second antenna port being QCL may also indicate that the transmission beam assumed by the receiving side corresponding to the first antenna port and the transmission beam assumed by the receiving side corresponding to the second antenna port are the same. The terminal device 1 may assume that the two antenna ports are QCL if the large-scale property of the channel on which the symbol is transmitted at one antenna port can be estimated according to the channel on which the symbol is transmitted at another antenna port. The two antenna ports being QCL may also indicate that the two antenna ports are assumed to be QCL.

For each of the subcarrier spacing configuration and carrier configuration, the resource grid of $N^\mu_{RB, x} N^{RB}_{sc}$ subcarriers and $N^{(\mu)}_{symb} N^{subframe, \mu}_{symb}$ OFDM symbols is obtained. $N^\mu_{RB, x}$ may indicate the number of resource blocks obtained for the subcarrier spacing configuration $\mu$ of the carrier x. $N^\mu_{RB, x}$ may be the maximum number of resource blocks obtained for the subcarrier spacing configuration $\mu$ of the carrier x. Carrier x indicates any one of a downlink carrier or an uplink carrier. In other words, x is "DL" or "UL." $N^\mu_{RB}$ is a name that includes $N^\mu_{RB, DL}$ and/or $N^\mu_{RB, UL}$. $N^{RB}_{sc}$ may also indicate the number of subcarriers included in one resource block. At least one resource grid may be obtained for each antenna port p and/or each subcarrier spacing configuration $\mu$ and/or for each the transmission direction configuration. The transmission direction includes at least downlink (DL) and uplink (UL). Hereinafter, a part or all of a parameter set including at least the antenna port p, the subcarrier spacing configuration μ, and the transmission direction configuration may also be referred to as a first radio parameter set. In other words, one resource grid may be obtained for each first radio parameter set.

In the downlink, a carrier included in a serving cell is referred to as a downlink carrier (or a downlink component carrier). In the uplink, a carrier included in a serving cell is referred to as an uplink carrier (uplink component carrier). The downlink component carrier and the uplink component carrier are collectively referred to as a component carrier (or a carrier).

Each element in the resource grid obtained for each first radio parameter set is referred to as a resource element. The resource element may be determined by a frequency domain index $k_{sc}$ and a time domain index $l_{sym}$. For a certain first radio parameter set, the resource element is determined by a frequency domain index $k_{sc}$ and a time domain index $l_{sym}$. The resource element determined by the frequency domain index $k_{sc}$ and the time domain index $l_{sym}$ is referred to as a resource element ($k_{sc}$, $l_{sym}$). The frequency domain index $k_{sc}$ indicates any value from 0 to $N^{\mu}_{RB} N^{RB}_{sc} - 1$. $N^{\mu}_{RB}$ may be the number of resource blocks obtained for the subcarrier spacing configuration μ. $N^{RB}_{sc}$ is the number of subcarriers included in the resource block, and $N^{RB}_{sc} = 12$. The frequency domain index $k_{sc}$ may correspond to the subcarrier index $k_{sc}$. The time domain index $l_{sym}$ may correspond to the OFDM symbol index $l_{sym}$.

Figure 3:
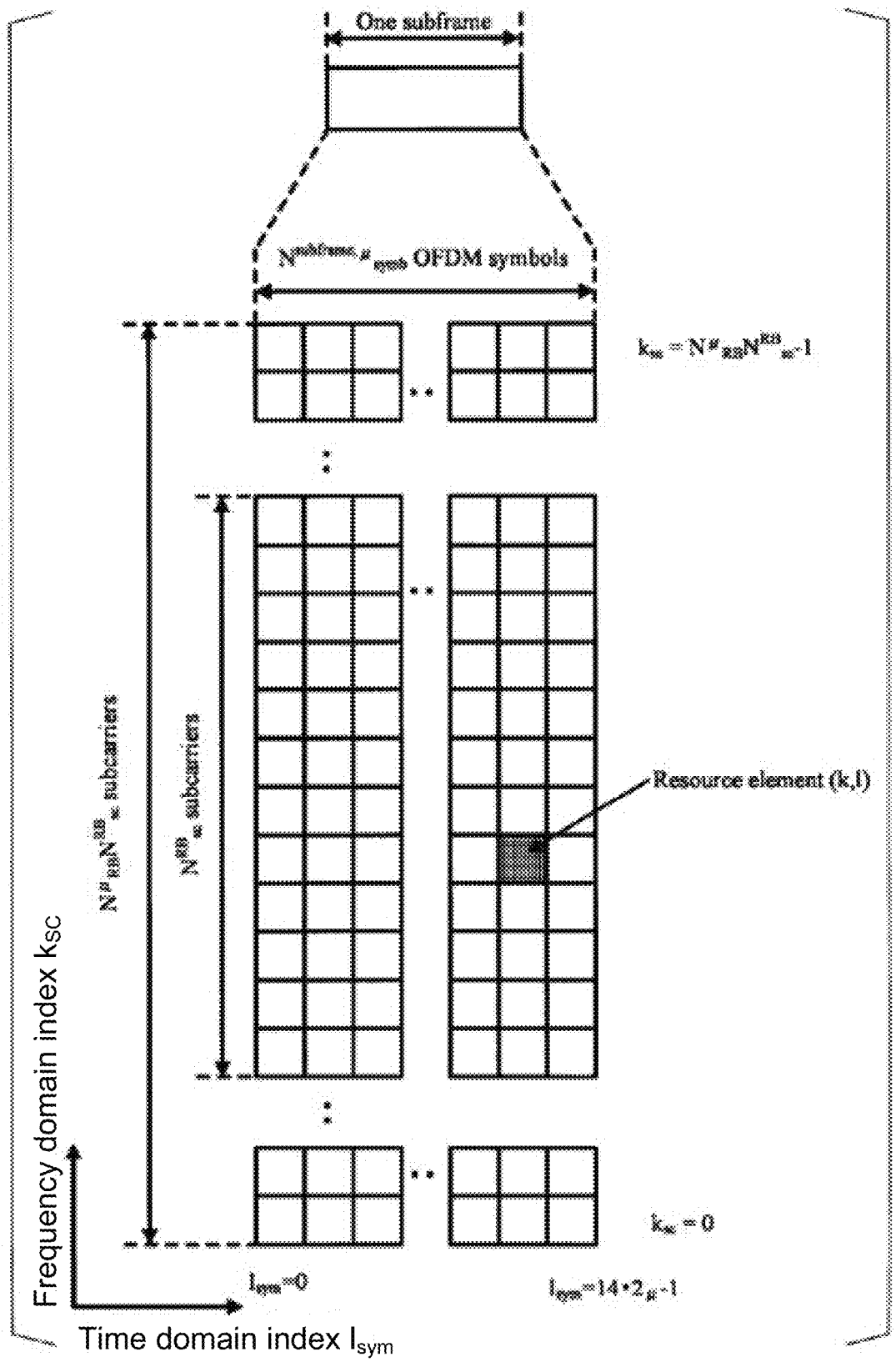
FIG. 3 is a schematic diagram of a resource grid of a subframe according to the present disclosure.

FIG. 3 is a schematic diagram of a resource grid of a subframe according to the present disclosure. In the resource grid of FIG. 3, the horizontal axis is the time domain index $l_{sym}$, and the vertical axis is the frequency domain index $k_{sc}$. In one subframe, the frequency domain resource grid includes $N^{\mu}_{RB} N^{RB}_{sc}$ subcarriers. In one subframe, the time domain resource grid may include $14 \cdot 2^{\mu}$ OFDM symbols. One resource block is composed of $N^{RB}_{sc}$ subcarriers. The time domain resource block may correspond to one OFDM symbol. The time domain resource block may correspond to 14 OFDM symbols. The time domain resource block may correspond to one or more slots. The time domain resource block may correspond to one subframe.

The terminal device 1 may be instructed to perform transmission and reception using only a subset of the resource grid. A subset of the resource grid may also be referred to as BWP, which may be obtained based on at least a part or all of higher layer parameters and/or the DCI. BWP is also called a bandwidth part (BP). In other words, the terminal device 1 may not be instructed to perform transmission and reception using all sets of the resource grid. In other words, the terminal device 1 may be instructed to perform transmission and reception using a part of frequency resources in the resource grid. One BWP may be composed of a plurality of resource blocks in the frequency domain. One BWP may be composed of a plurality of consecutive resource blocks in the frequency domain. A BWP configured for a downlink carrier is also referred to as a downlink BWP. A BWP configured for an uplink carrier is also referred to as an uplink BWP.

One or more downlink BWPs may be configured for the terminal device 1. The terminal device 1 may attempt to receive a physical channel (for example, PDCCH, PDSCH, Synchronization Signal (SS)/PBCH (Physical Broadcast Channel), etc.) in one downlink BWP of one or more downlink BWPs. The one downlink BWP is also referred to as an activated downlink BWP.

One or more uplink BWPs may be configured for the terminal device 1. The terminal device 1 may attempt to transmit a physical channel (for example, PUCCH, PUSCH, Physical random access channel (PRACH), etc.) in one uplink BWP of one or more uplink BWPs. The one uplink BWP is also referred to as an activated uplink BWP.

A set of downlink BWPs may be configured for each of the serving cells. The set of downlink BWPs may include one or more downlink BWPs. A set of uplink BWPs may be set for each of the serving cells. The set of uplink BWPs may include one or more uplink BWPs.

The higher layer parameters are parameters included in a higher layer signal. The higher layer signal may be RRC (Radio Resource Control) signaling or a MAC CE (Medium Access Control Element). The higher layer signal may be an RRC layer signal or a MAC layer signal.

The higher layer signal may be common RRC signaling. The common RRC signaling may include at least a part or all of the following Features C1 to C3.

Feature C1) mapped to a BCCH (Broadcast Control Channel) logical channel or a CCCH (Common Control CHannel) logical channel Feature C2) including at least a radioResourceConfig-Common information element Feature C3) mapped to a PBCH (Physical Broadcast Channel)

The radioResourceConfigCommon information element may include information indicating a configuration commonly used in the serving cell. The configuration commonly used in the serving cell may include at least the configuration of the PRACH. The configuration of the PRACH may indicate at least one or more random access preamble indexes. The configuration of the PRACH may indicate at least a time/frequency resource of the PRACH.

The higher layer signal may be dedicated RRC signaling. The dedicated RRC signaling may include at least a part or all of the following Features D1 to D2.

Feature D1) mapped to a DCCH logical channel

Feature D2) including at least a radioResourceConfigDedicated information element The radioResourceConfigDedicated information element may include at least information indicating a configuration specific to the terminal device 1. The radioResourceConfigDedicated information element may include at least information indicating a BWP configuration. The configuration of the BWP may indicate at least a frequency resource of the BWP.

For example, the master information block (MIB), the first system information, and the second system information may be included in common RRC signaling. Furthermore, a higher layer message that is mapped to the DCCH logical channel and includes at least the radioResourceConfigCommon information element may be included in the common RRC signaling. Furthermore, a higher layer message that is mapped to the DCCH logical channel and does not include the radioResourceConfigCommon information element may also be included in the dedicated RRC signaling. Furthermore, a higher layer message that is mapped to the DCCH logical channel and that includes at least the radioResourceConfigDedicated information element may also be included in the dedicated RRC signaling.

The first system information may indicate at least a time index of an SS (Synchronization Signal) block. An SS block is also referred to as an SS/PBCH block. The SS/PBCH block is referred to as SS/PBCH. The first system information may include at least information related to the PRACH resource. The first system information may include at least information related to the configuration of the initial connection. The second system information may be system information other than the first system information.

The radioResourceConfigDedicated information element may include at least information related to the PRACH resource. The radioResourceConfigDedicated information element may include at least information related to the configuration of the initial connection.

Hereinafter, physical channels and physical signals according to various implementations of the present disclosure will be described.

An uplink physical channel may correspond to a set of resource elements that carry information generated in a higher layer. An uplink physical channel is a physical channel used in an uplink carrier. In the radio communications system according to one aspect of the present disclosure, at least some or all of the following uplink physical channels are used.

a Physical uplink control channel (PUCCH)
a Physical uplink shared channel (PUSCH)
a Physical random access channel (PRACH)

The PUCCH may be used for transmitting uplink control information (UCI). The uplink control information includes channel state information (CSI), a scheduling request (SR), and part or all of a HARQ-ACK (Hybrid Automatic Repeat request ACKnowledgement) corresponding to transport blocks (TBs) (MAC (Medium Access Control) PDU (Protocol Data Unit), a DL-SCH (Downlink-Shared Channel), and a PDSCH (Physical Downlink Shared Channel)).

The HARQ-ACK may include at least a HARQ-ACK bit corresponding to at least one transport block. The HARQ-ACK bit may indicate ACK (acknowledgement) or NACK (negative-acknowledgement) corresponding to one or more transport blocks. A HARQ-ACK may include at least a HARQ-ACK codebook including one or more HARQ-ACK bits. The HARQ-ACK bit corresponding to one or more transport blocks may indicate that the HARQ-ACK bit corresponds to a PDSCH including the one or more transport blocks.

The HARQ-ACK bit may indicate ACK or NACK corresponding to one CBG (Code Block Group) included in the transport block. HARQ-ACK is also referred to as HARQ feedback, HARQ information, or HARQ control information.

A Scheduling Request (SR) may be used to request PUSCH resources for initial transmission. The scheduling request bit may be used to indicate either a positive SR or a negative SR. The scheduling request bit indicating a positive SR may also be referred to as "transmitting a positive SR." A positive SR may indicate that the terminal device 1 requests a PUSCH resource for initial transmission. A positive SR may indicate that the scheduling request is triggered by higher layers. A positive SR may be transmitted when the higher layer indicates transmission of a scheduling request. The scheduling request bit indicating a negative SR may also referred to as "transmitting a negative SR." A negative SR may indicate that the terminal device 1 does not request PUSCH resources for initial transmission. A negative SR may indicate that the scheduling request is not triggered by higher layers. A negative SR may be transmitted when the higher layer does not indicate transmission of a scheduling request.

The channel state information may include at least a part or all of a channel quality indicator (CQI), a precoder matrix indicator (PMI), and a rank indicator (RI). The CQI is an index related to channel quality (for example, transmission strength), and the PMI is an index indicating a precoder. The RI is an index indicating the transmission rank (or the number of transmission layers).

The PUCCH supports PUCCH format (PUCCH format 0 to PUCCH format 4). The PUCCH format may be mapped to the PUCCH and transmitted. The PUCCH format may be transmitted with the PUCCH. The transmission of the PUCCH format may also indicate the transmission of the PUCCH.

The PUSCH is used for transmitting at least a transport block (MAC PDU, UL-SCH (Uplink-Shared CHannel), PUSCH). The PUSCH may also be used for transmitting at least a part or all of the transport blocks, the HARQ-ACK, channel state information, and scheduling requests. The PUSCH is used for transmitting the random access message 3.

The PRACH is used for transmitting a random access preamble (random access message 1). The PRACH is used in a part or all of an initial connection establishment procedure, a handover procedure, a connection re-establishment procedure, synchronization (timing adjustment) for PUSCH transmission, and a resource request for the PUSCH. The random access preamble may be used for notifying the base station device 3 of an index (random access preamble index) obtained from a higher layer of the terminal device 1.

In FIG. 1, the following uplink physical signals are used in the uplink radio communications. The uplink physical signal may not be used for transmitting information output from a higher layer, but is used by the physical layer.

An UL DMRS (UpLink Demodulation Reference Signal)
An SRS (Sounding Reference Signal)
An UL PTRS (UpLink Phase Tracking Reference Signal)

The UL DMRS is related to transmission of a PUSCH and/or a PUCCH. The UL DMRS is multiplexed with the PUSCH or PUCCH. The base station device 3 may use the UL DMRS to perform the PUSCH or PUCCH channel correction. Hereinafter, transmitting the PUSCH and the UL DMRS related to the PUSCH together is referred to as transmitting the PUSCH for simplicity. Hereinafter, transmitting the PUCCH and the UL DMRS related to the PUCCH together is referred to as transmitting the PUCCH for simplicity. The UL DMRS related to the PUSCH is also referred to as an UL DMRS for PUSCH. The UL DMRS related to the PUCCH is also referred to as an UL DMRS for PUCCH.

The SRS may not be related to the PUSCH or PUCCH transmission. The base station device 3 may use the SRS for measuring the channel state. The SRS may be transmitted in the last OFDM symbol of a subframe or in the OFDM symbol that is a predetermined number of OFDM symbols from the last OFDM symbol.

The UL PTRS may be a reference signal used at least for phase tracking. The UL PTRS may be related to a UL DMRS group that includes at least an antenna port used for one or more UL DMRS. The relationship between the UL PTRS and the UL DMRS group may indicate that at least a part or all of the antenna ports of the UL PTRS and the antenna ports included in the UL DMRS group are QCL. The UL DMRS group may be identified based on at least the antenna port with the smallest index in the UL DMRS included in the UL DMRS group. The UL PTRS may be mapped to the antenna port with the smallest index in one or more antenna ports to which one codeword is mapped. The UL PTRS may be mapped to a first layer when one codeword is mapped to at least the first layer and the second layer. The UL PTRS may not be mapped to the second layer. The index of the antenna port to which the UL PTRS is mapped may be obtained based on at least the downlink control information.

In FIG. 1, the following downlink physical channels are used in the downlink radio communications from the base station device 3 to the terminal device 1. The downlink physical channel is used by the physical layer to transmit information output from a higher layer.

A PBCH (Physical Broadcast Channel)

A PDCCH (Physical Downlink Control Channel)

A PDSCH (Physical Downlink Shared Channel)

The PBCH is used for transmitting at least a master information block (MIB, BCH). The PBCH may be transmitted based on a predetermined transmission interval. The PBCH may be transmitted with 80 ms intervals. The PBCH may be transmitted with 160 ms intervals. The content of the information included in the PBCH may be updated every 80 ms. A part or all of the information included in the PBCH may also be updated every 160 ms. The PBCH may be composed of 288 subcarriers. The PBCH may include 2, 3, or 4 OFDM symbols. The MIB may include information related to an identifier (index) of the synchronization signal. The MIB may include at least a part of the information indicating a slot number for transmitting the PBCH, a subframe number, and/or a radio frame number.

The PDCCH is used for transmitting at least downlink control information (DCI). The PDCCH may include at least the downlink control information. The PDCCH may include the downlink control information. The downlink control information may also be referred to as a DCI format. The downlink control information may include at least a downlink grant or an uplink grant. The DCI format used for PDSCH scheduling is referred to as a downlink DCI format. The DCI format used for PUSCH scheduling is referred to as an uplink DCI format. A downlink grant is also referred to as a downlink assignment or a downlink allocation.

In various implementations of the present disclosure, unless otherwise specified, the number of resource blocks indicates the number of resource blocks in the frequency domain.

The downlink grant is used for scheduling at least one PDSCH in one serving cell.

The uplink grant is used for scheduling at least one PUSCH in one serving cell.

One physical channel may be mapped to one serving cell. One physical channel may be mapped to one BWP configured for one carrier included in one serving cell.

The terminal device 1 may be configured with one or more control resource set (CORESET). The terminal device 1 monitors the PDCCH in one or more control resource set. Here, monitoring a PDCCH in one or more control resource set may include monitoring one or more PDCCH corresponding to each of the one or more control resource set. Furthermore, the PDCCH may include one or more PDCCH candidate and/or PDCCH candidate set. Furthermore, monitoring the PDCCH may include monitoring and detecting the PDCCH and/or the DCI format transmitted over the PDCCH.

The control resource set may indicate a time-frequency domain to which one or more PDCCH can be mapped. The control resource set may be an area where the terminal device 1 monitors the PDCCH. The control resource set may be composed of a localized resource. The control resource set may also be composed of a distributed resource.

In the frequency domain, the unit of mapping of the control resource set may be a resource block. For example, in the frequency domain, the unit of mapping of the control resource set may be six resource blocks. In the time domain, the unit of mapping of the control resource set may be an OFDM symbol. For example, in the time domain, the unit of mapping of the control resource set may be 1 OFDM symbol.

The mapping of the control resource set to the resource blocks may be obtained based on at least the higher layer parameters. The higher layer parameter may include a bitmap for a resource block group (RBG). The resource block group may be obtained with six consecutive resource blocks.

The number of OFDM symbols that compose the control resource set may be obtained based on at least the higher layer parameters.

A certain control resource set may be a common control resource set. The common control resource set may be a control resource set commonly configured for a plurality of terminal devices 1. The common control resource set may be obtained based on at least a part or all of the MIB, the first system information, the second system information, the common RRC signaling, and the cell ID (identity). For example, the time resource and/or the frequency resource of the control resource set configured for monitoring the PDCCH used for scheduling the first system information may be obtained based on at least the MIB.

The control resource set configured by the MIB is also referred to as CORESET#0. CORESET#0 may be a control resource set with index #0.

A certain control resource set may be a dedicated control resource set. The dedicated control resource set may be a control resource set configured to be used exclusively for the terminal device 1. The dedicated control resource set may be obtained based on at least a part or all of the dedicated RRC signaling and the value of the cell radio network temporary identifier (C-RNTI).

The PDCCH candidate set monitored by the terminal device 1 may be defined in terms of a search area. In other words, the PDCCH candidate set monitored by the terminal device 1 may be obtained according to the search area.

The search area may be composed of one or more PDCCH candidates with or more aggregation levels included. The aggregation level of the PDCCH candidates may indicate the number of control channel elements (CCEs) composing the PDCCH. The PDDCH candidates may be mapped to one or more CCEs.

The terminal device 1 may monitor at least one or more search areas in a slot in which the DRX (Discontinuous reception) is not configured. The DRX may be obtained based on at least the higher layer parameters. The terminal device 1 may monitor at least one or more search area sets in slots in which DRX is not configured.

The search area set may include at least one or more search areas.

Each of the search area sets may be associated with at least one control resource set. Each of the search area sets may be included in one control resource set. For each of the search area sets, an index of a control resource set associated with the search area set may be obtained.

The physical resource of the search area is configured by a control channel element (CCE). The CCE is composed of a predetermined number of resource element groups (REG). For example, a CCE may be composed of six REGs. The REG may be composed of one OFDM symbol of one PRB (Physical Resource Block). In other words, the REG may be composed of 12 resource elements (RE). The PRB is referred to as an RB (Resource Block) for simplicity.

The PDSCH is used for transmitting at least a transport block. The PDSCH may be used for transmitting at least the random access message 2 (random access response). The PDSCH may be used for transmitting at least system information including parameters used for initial access.

In FIG. 1, the following downlink physical signals are used in downlink radio communications. The downlink physical signal may not be used for transmitting information output from a higher layer, but is used by the physical layer.

A Synchronization signal (SS)

A DL DMRS (DownLink DeModulation Reference Signal)

A CSI-RS (Channel State Information-Reference Signal)

A DL PTRS (DownLink Phase Tracking Reference Signal)

The synchronization signal is used by the terminal device 1 to synchronize in the downlink frequency domain and/or time domain. The synchronization signal includes a PSS (Primary Synchronization Signal) and an SSS (Secondary Synchronization Signal).

The SS block (SS/PBCH block) is composed of at least a part or all of the PSS, the SSS, and the PBCH.

The DL DMRS is related to the transmission of a PBCH, a PDCCH and/or a PDSCH. The DL DMRS is multiplexed on a PBCH, a PDCCH, and/or a PDSCH. The terminal device 1 may use the PBCH, the PDCCH, or the DL DMRS corresponding to the PDSCH to perform channel correction of the PBCH, the PDCCH, or the PDSCH.

The CSI-RS may be a signal used for calculating at least channel state information. The CSI-RS type assumed by the terminal device may be obtained by at least the higher layer parameters.

The PTRS may be a signal used for at least phase noise compensation. The PTRS type assumed by the terminal device may be obtained based on at least the higher layer parameters and/or the DCI.

The DL PTRS may be associated with a DL DMRS group, which includes at least an antenna port used for one or more DL DMRS.

The downlink physical channel and the downlink physical signal are also referred to as a downlink signal. The uplink physical channel and the uplink physical signal are also referred to as an uplink signal. The downlink signal and the uplink signal are collectively referred to as a physical signal. The downlink signal and the uplink signal are also collectively referred to as a signal. The downlink physical channel and the uplink physical channel are collectively referred to as a physical channel. The downlink physical signal and the uplink physical signal are collectively referred to as a physical signal.

The BCH (Broadcast Channel), the UL-SCH (Uplink-Shared Channel) and the DL-SCH (Downlink-Shared Channel) are transport channels. A channel used in a medium access control (MAC) layer is referred to as a transport channel. The unit of the transport channel used in the MAC layer is also referred to as a transport block (TB) or MAC PDU. In the MAC layer, HARQ (Hybrid Automatic Repeat request) control is performed for each transport block. The transport block is a unit of data that the MAC layer delivers to the physical layer. In the physical layer, the transport blocks are mapped to the codewords, and modulation processing is performed for each codeword.

The base station device 3 and the terminal device 1 exchange (transmit and receive) higher layer signals in the higher layer. For example, the base station device 3 and the terminal device 1 may transmit and receive the RRC signaling (RRC message: Radio Resource Control message, RRC information: Radio Resource Control information) in a radio resource control (RRC) layer. Furthermore, the base station device 3 and the terminal device 1 may transmit and receive a MAC CE (Control Element) in the MAC layer. The RRC signaling and/or the MAC CE are also referred to as the higher layer signaling.

The PUSCH and PDSCH may be used for transmitting at least RRC signaling and/or a MAC CE. The RRC signaling transmitted by the PDSCH from the base station device 3 may be common signaling to a plurality of terminal devices 1 in the serving cell. The common signaling is referred to as common RRC signaling. The RRC signaling transmitted by the PDSCH from the base station device 3 may be signaling dedicated to a certain terminal device 1 (also referred to as dedicated signaling or UE specific signaling). The signaling dedicated to the certain terminal device 1 is also referred to as dedicated RRC signaling. The higher layer parameters specific to the serving cell may be transmitted by using the common signaling or by using the dedicated signaling. The UE specific higher layer parameters may be transmitted to a certain terminal device 1 using the dedicated signaling.

The BCCH (Broadcast Control Channel), the CCCH (Common Control Channel), and the DCCH (Dedicated Control Channel) are logical channels. For example, the BCCH is a higher layer channel used for transmitting MIB. Furthermore, the CCCH (Common Control Channel) is a higher layer channel used for transmitting information common to a plurality of terminal devices 1. The CCCH may be used, for example, for the terminal device 1 that is not connected to the RRC. Furthermore, the DCCH (Dedicated Control Channel) is a higher layer channel used for transmitting at least the dedicated control information to the terminal device 1. The DCCH may be used, for example, for the terminal device 1 connected to the RRC.

The BCCH in the logical channel may be mapped to the BCH, DL-SCH, or UL-SCH in the transport channel. The CCCH of a logical channel may be mapped to a DL-SCH or a UL-SCH in a transport channel. The DCCH of the logical channel may be mapped to the DL-SCH or UL-SCH in the transport channel.

The UL-SCH in transport channel may be mapped to the PUSCH in the physical channel. The DL-SCH of the transport channel may be mapped to the PDSCH in the physical channel. The BCH of the transport channel may be mapped to the PBCH in the physical channel.

An example of a configuration of the terminal device 1 according to one aspect of the present disclosure will be described.

Figure 4:
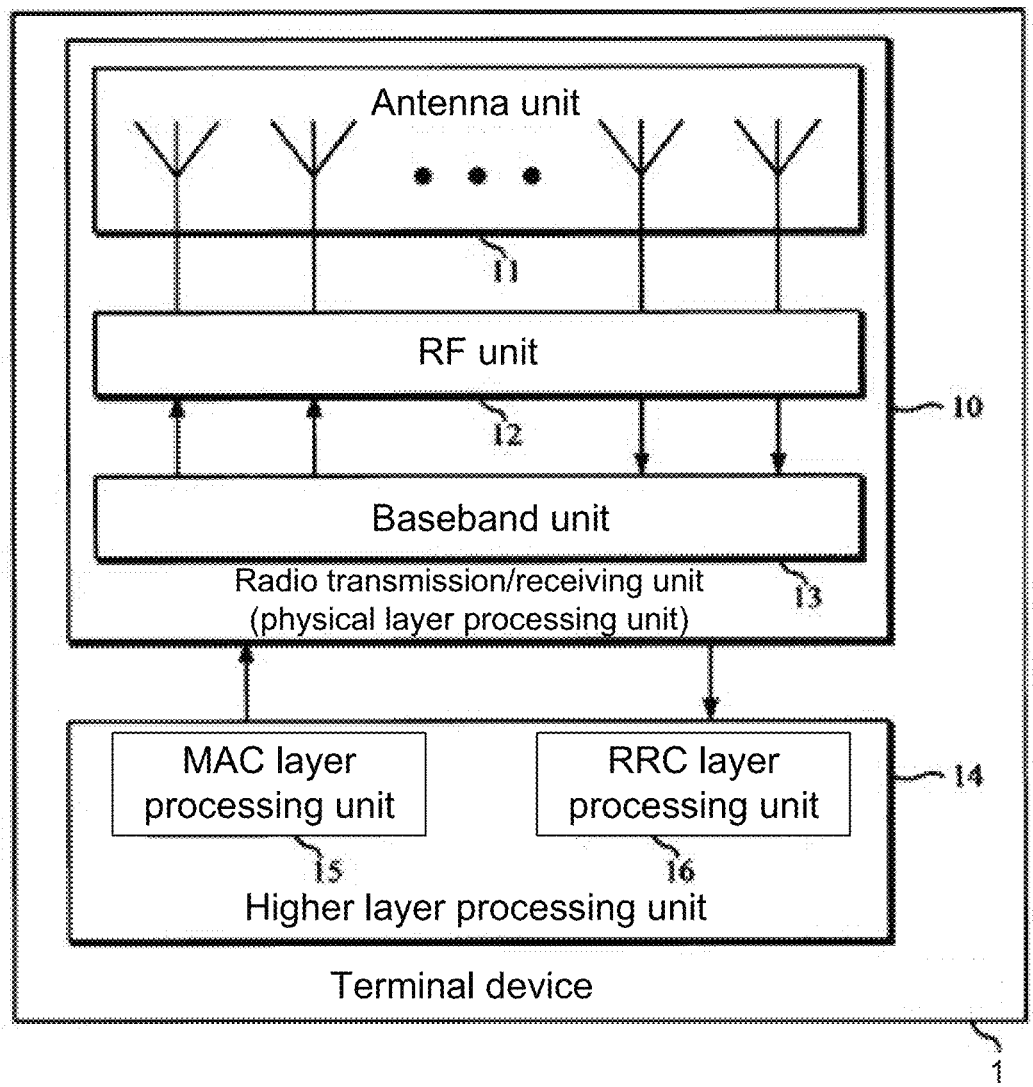
FIG. 4 is a schematic block diagram of a configuration of a terminal device according to the present disclosure.

FIG. 4 is a schematic block diagram of a configuration of a terminal device 1 according to the present disclosure. As illustrated, the terminal device 1 includes a radio transmission/receiving unit 10 and a higher layer processing unit 14. The radio transmission/receiving unit 10 includes at least a part or all of an antenna unit 11, an RF (Radio Frequency) unit 12, and a baseband unit 13. The higher layer processing unit 14 is configured to include at least a part or all of a medium access control layer processing unit 15 and a radio resource control layer processing unit 16. The radio transmission/receiving unit 10 is also referred to as a transmission unit, a receiving unit, or a physical layer processing unit.

The higher layer processing unit 14 outputs the uplink data (transport block) generated by a user operation or the like to the radio transmission/receiving unit 10. The higher layer processing unit 14 performs processing of a MAC layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various configuration information/parameters of the terminal device. The radio resource control layer processing unit 16 configures various configuration information/parameters based on the higher layer signal received from the base station device 3. In other words, the radio resource control layer processing unit 16 configures various configuration information/parameters based on the information indicating various configuration information/parameters received from the base station device 3. Furthermore, the configuration information may include information related to processing or configuring of a physical channel, a physical signal (i.e., a physical layer), a MAC layer, a PDCP layer, an RLC layer, and an RRC layer. The parameters may also be higher layer parameters.

The radio transmission/receiving unit 10 performs physical layer processing, such as modulation, demodulation, encoding, and decoding. The radio transmission/receiving unit 10 separates, demodulates, and decodes the received physical signal, and outputs the information to the higher layer processing unit 14. The radio transmission/receiving unit 10 generates a physical signal by modulating data, encoding, and generating a baseband signal (conversion to a time continuous signal), and transmits the physical signal to the base station device 3.

The RF unit 12 converts a signal received via the antenna unit 11 into a baseband signal (down-conversion) by quadrature demodulation, and removes undesirable frequency components. The RF unit 12 outputs the processed analog signal to the baseband unit.

The baseband unit 13 converts the analog signal input from the RF unit 12 into a digital signal. The baseband unit 13 removes a portion that corresponds to a CP (Cyclic Prefix) from the converted digital signal, performs fast Fourier transform (FFT) on the signal from which the CP has been removed, and extracts the signal in the frequency domain.

The baseband unit 13 performs an inverse fast Fourier transform (IFFT) on the data, generates an OFDM symbol, appends a CP to the generated OFDM symbol, generates a baseband digital signal, and converts the baseband digital signal into an analog signal. The baseband unit 13 outputs the converted analog signal to the RF unit 12.

The RF unit 12 removes undesirable frequency components from the analog signal input from the baseband unit 13 using a low pass filter, up-converts the analog signal to a carrier frequency, and transmits the analog signal via the antenna unit 11. Furthermore, the RF unit 12 amplifies the power of the transmitted analog signal. Furthermore, the RF unit 12 may control the transmission power. The RF unit 12 is also referred to as a transmission power control unit.

Hereinafter, an example of the configuration of the base station device 3 according to one aspect of the present disclosure will be described.

Figure 5:
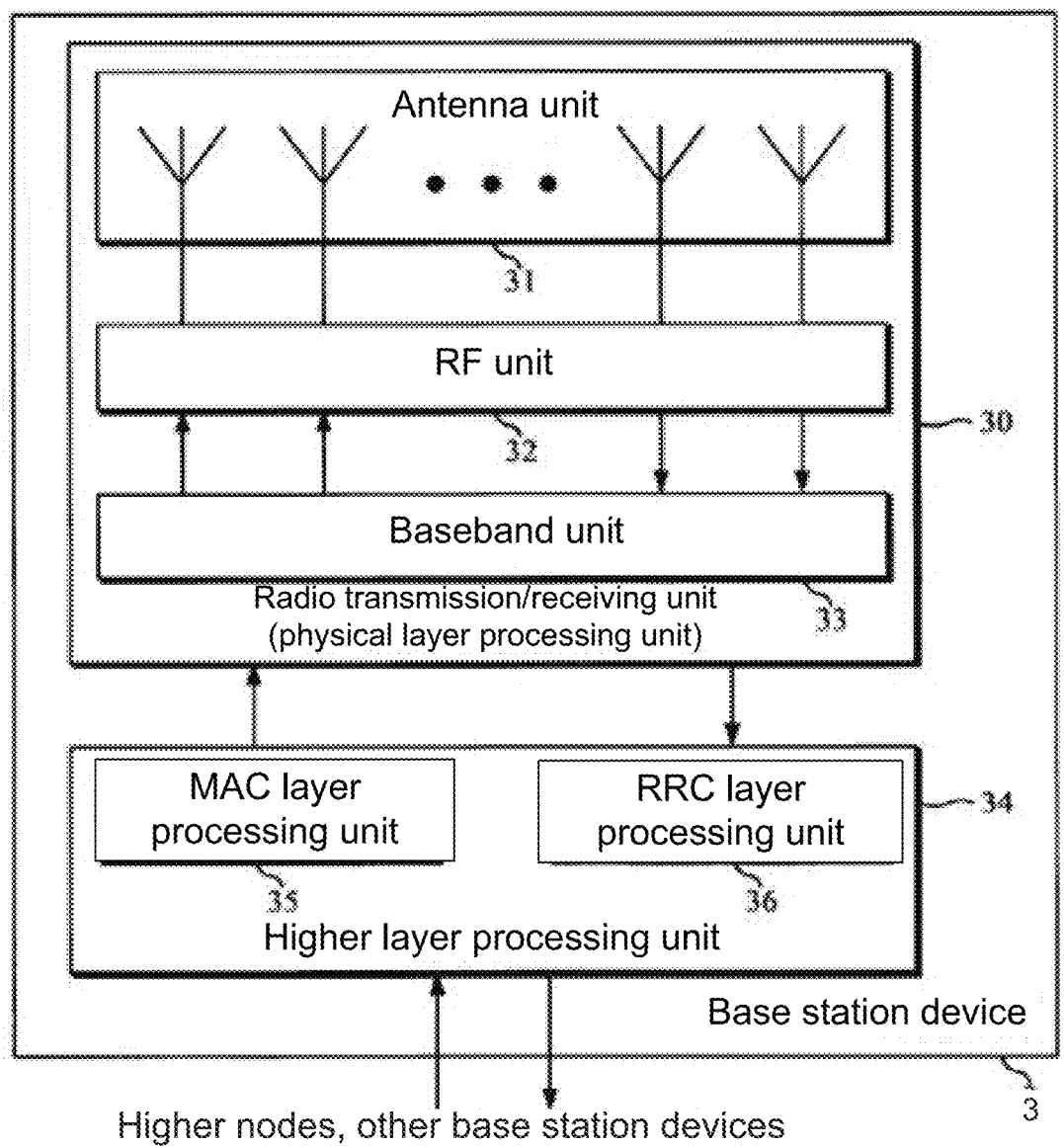
FIG. 5 is a schematic block diagram of a configuration of a base station device according to the present disclosure.

FIG. 5 is a schematic block diagram of a configuration of a base station device 3 according to the present disclosure. As illustrated, the base station device 3 is composed of a radio transmission/receiving unit 30 and a higher layer processing unit 34. The radio transmission/receiving unit 30 includes an antenna unit 31, an RF unit 32, and a baseband unit 33. The higher layer processing unit 34 includes a medium access control layer processing unit 35 and a radio resource control layer processing unit 36. The radio transmission/receiving unit 30 is also referred to as a transmission unit, a receiving unit, or a physical layer processing unit.

The higher layer processing unit 34 performs processing of the MAC layer, PDCP layer, RLC layer, and RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates downlink data (transport block), system information, an RRC message, a MAC CE, and other signals configured in the PDSCH, or acquires the data from the higher node, and outputs the data to the radio transmission/receiving unit 30. Furthermore, the radio resource control layer processing unit 36 manages various configuration information/parameters of each terminal device 1. The radio resource control layer processing unit 36 may configure various configuration information/parameters for each of the terminal devices 1 via a higher layer signal. In other words, the radio resource control layer processing unit 36 transmits/reports information indicating various configuration information/parameters. The configuration information may include information related to processing or configuring of a physical channel, a physical signal (i.e., a physical layer), a MAC layer, a PDCP layer, an RLC layer, and an RRC layer. The parameters may be higher layer parameters.

The functions of the radio transmission/receiving unit 30 are the same as the functions of the radio transmission/receiving unit 10, and will not be repeated.

Each of the units (e.g., denoted with reference numerals 10 to 16) included in the terminal device 1 may be composed of a circuit. Each of the units included in the base station device 3 may be composed of a circuit.

The terminal device 1 may multiplex the uplink control information (UCI) on the PUCCH and transmit it. The terminal device 1 may multiplex the UCI on the PUSCH and transmit it. The UCI may include the HARQ-ACK and/or the CSI.

A plurality of PUSCH types may be defined based on the type of data (UCI, UL-SCH) that have been multiplexed on the PUSCH before multiplexing the UCI related to the PUCCH on the PUSCH. For example, the PUSCH of aperiodic CSI (aperiodic CSI on PUSCH), the PUSCH of semi-persistent CSI (semi-persistent CSI on PUSCH), the PUSCH of dynamic scheduling (dynamically scheduled PUSCH), and the PUSCH of semi-static scheduling (semi-statically scheduled PUSCH) may be defined. The aperiodic CSI is also referred to as an aperiodic CSI. The semi-persistent CSI is also referred to as a semi-persistent CSI. In the present implementation, the PUSCH for dynamic scheduling does not include the random access message 3.

The PUSCH of the aperiodic CSI is a PUSCH on which the aperiodic CSI is multiplexed. The aperiodic CSI is a channel state information report that is performed aperiodically. The aperiodic channel state information report may be indicated based on at least the DCI format. The aperiodic channel state information report may be indicated based on at least a predetermined value configured to a code point of a CSI request field included in the DCI format.

The PUSCH of the semi-persistent CSI is referred to as a PUSCH on which the UCI of the semi-persistent CSI is multiplexed. The semi-persistent CSI is a channel state information report that is performed semi-persistently. For the activation or deactivation of the semi-persistent CSI report using the PUSCH, the terminal device 1 determines whether a part or all of the following requirements are satisfied. In other words, the semi-persistent CSI report using the PUSCH is activated using at least the DCI format.

Requirement A1: the DCI format is scrambled by a semi persistent-channel state information-radio network temporary identifier (SP-CSI-RNTI) obtained by the higher layer parameter sp-csi-RNTI Requirement A2: the specific DCI format field for activation of semi-persistent CSI is set to a predetermined value indicating the activation of semi-persistent CSI Requirement A3: the specific DCI format field for deactivation of semi-persistent CSI is set to a predetermined value indicating the deactivation of semi-persistent CSI The transmission of semi-persistent CSI may be activated when Requirements A1 and A2 are both satisfied. The transmission of semi-persistent CSI may be deactivated when Requirements A1 and A3 are both satisfied.

The PUSCH of the dynamic scheduling is dynamically scheduled by the uplink grant of the DCI format. The PUSCH may include a transport block. The PUSCH of the dynamic scheduling may be the PUSCH scheduled based on the DCI format and not indicated by the aperiodic CSI based on the DCI format.

The semi-statically scheduled PUSCH, which is scheduled by a grant trigger, is a PUSCH on which PUSCH resources are semi-statically allocated and a transport block is transmitted according to the higher layer parameters. The semi-statically scheduled PUSCH may include a type 1 semi-statically scheduled PUSCH and a type 2 semi-statically scheduled PUSCH. For the type 1 semi-statically scheduled PUSCH, transmission in the time domain may be indicated by a higher layer parameter timeDomainAllocation. The type 2 semi-statically scheduled PUSCH may be triggered by an uplink grant in the DCI format. A transmission interval (periodicity) for the semi-statically scheduled PUSCH may be obtained based on a higher layer parameter.

When the PUCCH does not conflict (overlap) with the PUSCH in the time domain, the terminal device 1 may multiplex and transmit the UCI related to the PUCCH on the PUCCH. When the PUCCH conflicts (overlaps) with the PUSCH in the time domain, the terminal device 1 may multiplex and transmit the UCI related to the PUCCH to the PUSCH, and may not transmit the PUCCH. The PUCCH may be a PUCCH configured with the transmission of the UCI. The transmission of the UCI may be provided based on at least the DCI format and/or the higher layer parameters.

The UCI related to the PUCCH does not include an aperiodic CSI. The UCI associated with the PUCCH does not include the semi-persistent CSI that is activated by the DCI format.

When the PUSCH of the aperiodic CSI and the dynamically scheduled PUSCH conflicts with the PUCCH in the time domain, the terminal device 1 may multiplex the UCI related to the PUCCH on the PUSCH of the aperiodic CSI and transmit the multiplexed UCI.

When the PUSCH of the aperiodic CSI and the semi-statically scheduled PUSCH conflicts with the PUCCH in the time domain, the terminal device 1 may multiplex the UCI related to the PUCCH on the PUSCH of the aperiodic CSI and transmit the multiplexed UCI.

When the dynamically scheduled PUSCH and the semi-statically scheduled PUSCH conflicts with the PUCCH in the time domain, the terminal device 1 may multiplex the UCI related to the PUCCH on the dynamically scheduled PUSCH and transmit the multiplexed UCI.

When a plurality of PUSCH (a set of PUSCH) conflicts with the PUCCH in the time domain, the PUSCH for multiplexing the UCI may be obtained based on at least an index of a serving cell to which each of the plurality of PUSCH is mapped and/or the starting position of each of the plurality of PUSCH. For example, when a plurality of PUSCH of the same PUSCH type conflict with the PUCCH in the time domain and the plurality of PUSCH are used for a plurality of serving cells, the terminal device 1 multiplexes the UCI related to the PUCCH to a serving cell with a lower identifier value and transmits the multiplexed UCI on the PUSCH of the serving cell. When a plurality of PUSCHs are transmitted in the serving cell, the terminal device 1 may multiplex the UCI related to the PUCCH to the first PUSCH in the time domain of the plurality of PUSCH in the serving cell and transmit the multiplexed UCI.

Figure 6:
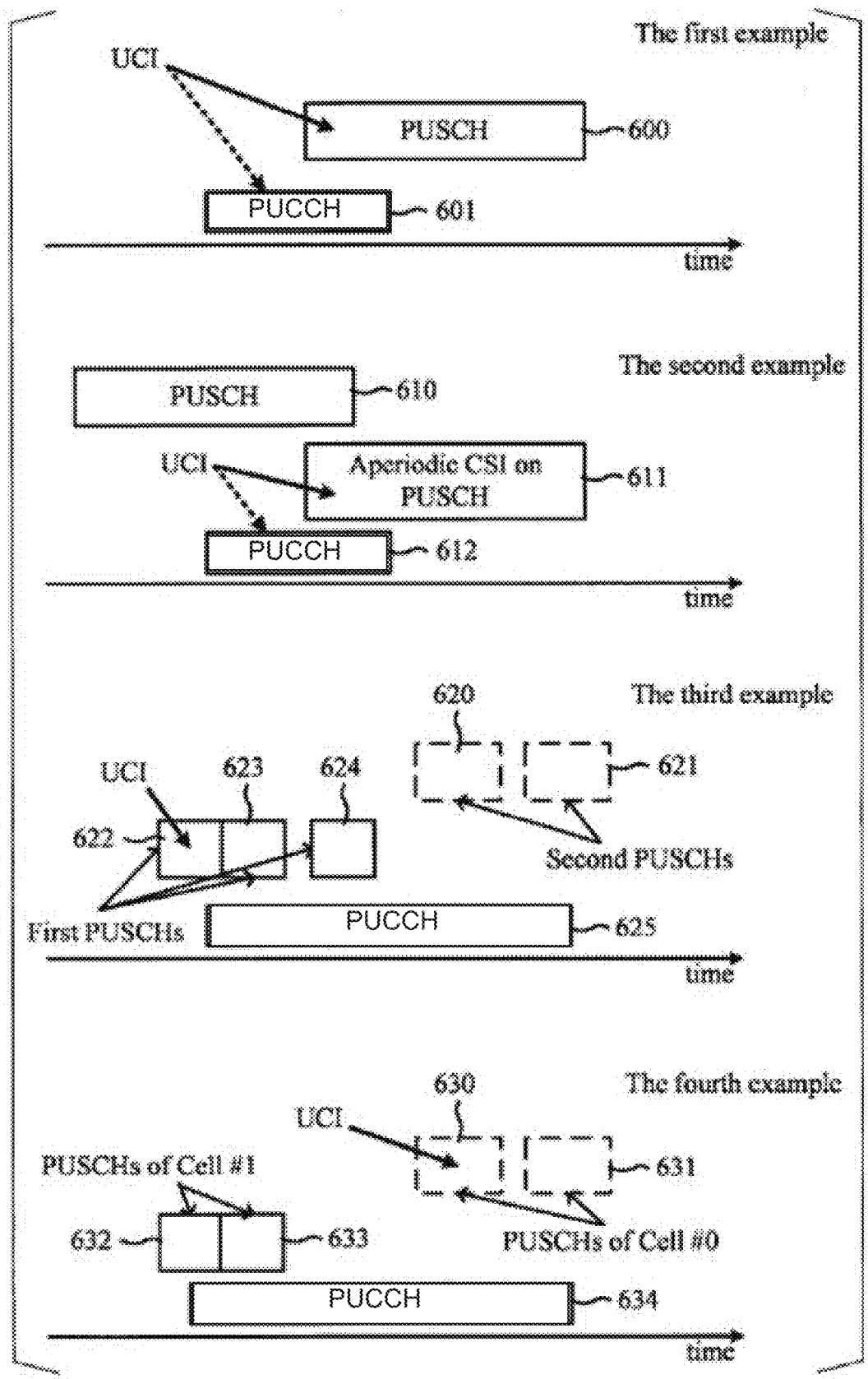
FIG. 6 is a schematic diagram illustrating selecting a PUSCH for transmitting a UCI when a PUCCH including the UCI conflicts with one or more PUSCHs in a time domain according to the present disclosure.

FIG. 6 is a diagram illustrating selecting a PUSCH for transmitting a UCI when a PUCCH including the UCI conflicts with one or more PUSCHs in the time domain according to the present disclosure.

In a first example, when the PUCCH 601 including the UCI conflicts with the PUSCH 600 in the time domain, the terminal device 1 transmits the UCI multiplexed on the PUSCH 600. The PUSCH 600 may be any one of a PUSCH of aperiodic CSI, a PUSCH of semi-persistent CSI (semi-persistent CSI on PUSCH), a dynamically scheduled PUSCH, and a semi-statically scheduled PUSCH. The PUCCH including the UCI may be a PUCCH on which transmission of the UCI is configured based on at least the higher layer parameters. The PUCCH including the UCI may be a PUCCH on which transmission of the UCI is instructed based on at least the DCI.

In the second example, when the PUCCH 612 including the UCI conflicts with the aperiodic CSI on PUSCH 611 and the PUSCH 610 in the time domain, the terminal device 1 multiplexes the UCI on the PUSCH 611 carrying aperiodic CSI and transmits the multiplexed UCI. The PUSCH 610 may be either a dynamically scheduled PUSCH or a semi-statically scheduled PUSCH.

In the third example, when the PUCCH 625 including the UCI includes a first PUSCH group (First PUSCHs), which includes one or more dynamically scheduled PUSCH 622, 623, and 624, conflicts with a second PUSCH group (Second PUSCHs) including one or more semi-statically scheduled PUSCH 620 and 621, the terminal device 1 multiplexes and transmits the UCI to one of the PUSCHs of the first PUSCH group.

In the fourth example, when the PUCCH 634 including the UCI conflicts with a plurality of dynamically scheduled PUSCH 630, 631, 632, and 633 in the time domain, the terminal device 1 multiplexes the UCI to the PUSCH 630 at the start in the time domain and to which the serving cell has a low value of the serving cell identifier and transmits the multiplexed UCI.

When the PUCCH including the UCI conflicts with one or more PUSCH in the time domain, the PUSCH transmitted by multiplexing the UCI is selected from the one or more PUSCH based at least on whether each of the one or more PUSCH is a PUSCH of semi-persistent CSI.

When the PUSCH of semi-persistent CSI and the PUSCH of aperiodic CSI and/or the dynamically scheduled PUSCH and/or the semi-statically scheduled PUSCH conflicts with the PUCCH including UCI in the time domain, the terminal device 1 multiplexes and transmits the UCI on the PUSCH of the semi-persistent CSI. When the PUSCH of the semi-persistent CSI and the first PUSCH group conflicts with the PUCCH including the UCI in the time domain, the UCI is multiplexed and transmitted on the PUSCH of the semi-persistent CSI. The first PUSCH group includes at least a part or all of one or more PUSCH of the aperiodic CSI, one or more dynamically scheduled PUSCH, and/or one or more semi-statically scheduled PUSCH. For example, when the PUSCH of the semi-permanent CSI and the PUSCH of the aperiodic CSI conflicts with the PUCCH including the UCI in the time domain, the UCI may be multiplexed and transmitted on the PUSCH of the semi-permanent CSI. Furthermore, when the PUSCH of the semi-persistent CSI and the dynamically scheduled PUSCH conflicts with the PUCCH including the UCI in the time domain, the UCI is multiplexed and transmitted on the PUSCH of the semi-persistent CSI.

When the PUCCH including the UCI conflicts with the PUSCH of the semi-permanent CSI and the PUSCH of the aperiodic CSI in the time domain, the terminal device 1 multiplexes and transmits the UCI on the PUSCH of the aperiodic CSI. When the PUCCH including the UCI conflicts with the PUSCH of the semi-persistent CSI and the dynamically scheduled PUSCH and/or the semi-statically scheduled PUSCH in the time domain, the terminal device 1 multiplexes and transmits the UCI on the PUSCH of the semi-persistent CSI. When the PUSCH of the semi-permanent CSI and the PUSCH of the aperiodic CSI conflicts with the PUCCH including the UCI in the time domain, the UCI is multiplexed and transmitted on the PUSCH of the aperiodic CSI. When the PUSCH of the semi-persistent CSI and the second PUSCH group conflict with the PUCCH including the UCI in the time domain, the UCI is multiplexed and transmitted on the PUSCH of the semi-persistent CSI. The second PUSCH group may include at least a part or all of one or more dynamically scheduled PUSCH and/or one or more semi-statically scheduled PUSCH.

When the PUCCH including the UCI conflicts with the PUSCH of the semi-permanent CSI and the PUSCH of the aperiodic CSI in the time domain, the terminal device 1 multiplexes and transmit the UCI on the PUSCH of the aperiodic CSI. When the PUCCH including the UCI conflicts simultaneously with the PUSCH of the semi-persistent CSI and the dynamically scheduled PUSCH in the time domain, the terminal device 1 multiplexes the UCI on the dynamically scheduled PUSCH and transmit the multiplexed UCI. When the PUCCH including the UCI conflicts with the PUSCH of the semi-persistent CSI and the semi-statically scheduled PUSCH in the time domain, the UCI is multiplexed and transmitted on the PUSCH of the semi-persistent CSI. When the PUSCH of the semi-persistent CSI and the third PUSCH group conflict with the PUCCH including the UCI in the time domain, the UCI is multiplexed and transmitted on one PUSCH selected from the third PUSCH group. The third PUSCH group may include at least a part or all of one or more PUSCH of the aperiodic CSI and/or one or more dynamically scheduled PUSCH. For example, when the PUSCH of the semi-permanent CSI and the PUSCH of the aperiodic CSI conflict with the PUCCH including the UCI in the time domain, the UCI is multiplexed and transmitted on the PUSCH of the aperiodic CSI. Furthermore, when the PUSCH of the semi-persistent CSI and the dynamically scheduled PUSCH conflicts with the PUCCH including the UCI in the time domain, the UCI is multiplexed and transmitted on the dynamically scheduled PUSCH. When the PUSCH of semi-persistent CSI and the semi-statically scheduled PUSCH conflicts with the PUCCH including UCI in the time domain, the UCI is multiplexed and transmitted on the PUSCH of semi-persistent CSI.

When the PUCCH including the UCI conflicts with the PUSCH of the semi-permanent CSI and the PUSCH of the aperiodic CSI in the time domain, the terminal device 1 multiplexes and transmits the UCI on the PUSCH of the aperiodic CSI. When the PUCCH including the UCI conflicts with the PUSCH of the semi-persistent CSI and the dynamically scheduled PUSCH in the time domain, the terminal device 1 multiplexes the UCI on the dynamically scheduled PUSCH and transmits the multiplexed UCI. When the PUCCH including the UCI conflicts simultaneously with the PUSCH of the semi-persistent CSI and the semi-statically scheduled PUSCH in the time domain, the terminal device 1 multiplexes and transmits the UCI on the semi-statically scheduled PUSCH. When the PUSCH of the semi-persistent CSI and the fourth PUSCH group conflicts with the PUCCH including the UCI in the time domain, the UCI is multiplexed and transmitted on one PUSCH selected from the fourth PUSCH group. The fourth PUSCH group may include at least a part or all of one or more PUSCH of the aperiodic CSI, one or more dynamically scheduled PUSCH, and/or one or more semi-statically scheduled PUSCH.

When the PUCCH including the UCI conflicts with the fifth PUSCH group in the time domain, the terminal device 1 multiplexes the UCI on one PUSCH selected from the fifth PUSCH group and transmit the multiplexed UCI. When the PUCCH including the UCI conflicts with the fifth PUSCH group and the sixth PUSCH group in the time domain, the terminal device 1 multiplexes and transmits the UCI on one PUSCH selected from the fifth PUSCH group. The fifth PUSCH group may include at least a part or all of one or more PUSCH of the semi-persistent CSI and/or one or more PUSCH of the aperiodic CSI. The sixth PUSCH group may include at least a part or all of one or more dynamically scheduled PUSCH and/or one or more semi-statically scheduled PUSCHs. The one PUSCH selected from the fifth PUSCH group is obtained based on at least an index of a serving cell to which each of the PUSCH included in the fifth PUSCH is mapped, and/or the corresponding starting position of the PUSCH included in the fifth PUSCH group.

When the PUCCH including the UCI conflicts with the PUSCH of the aperiodic CSI and the seventh PUSCH group in the time domain, the terminal device 1 multiplexes the UCI on the PUSCH of the aperiodic CSI and transmits the multiplexed UCI. The seventh PUSCH group may include at least a part or all of one or more PUSCH of the semi-persistent CSI and/or one or more dynamically scheduled PUSCH. When the PUCCH including the UCI conflicts with the PUSCH of the aperiodic CSI and the semi-statically scheduled PUSCH in the time domain, the terminal device 1 multiplexes and transmits the UCI on the PUSCH of the aperiodic CSI. When the PUCCH including the UCI conflicts with the seventh PUSCH group and the semi-statically scheduled PUSCH in the time domain, the terminal device 1 multiplexes and transmits the UCI on the PUSCH selected from the seventh PUSCH group. The PUSCH selected from the seventh PUSCH group is obtained based on at least an index of a serving cell to which each of the PUSCH included in the seventh PUSCH is mapped, and/or the respective starting position of the PUSCH included in the seventh PUSCH group.

When the PUCCH including the UCI conflicts with the PUSCH of the aperiodic CSI and the dynamically scheduled PUSCH in the time domain, the terminal device 1 multiplexes and transmits the UCI on the PUSCH of the aperiodic CSI. When the PUCCH including the UCI conflicts with the PUSCH of the aperiodic CSI and the eighth PUSCH group in the time domain, the terminal device 1 multiplexes the UCI on the PUSCH of the aperiodic CSI and transmits the multiplexed UCI. The eighth PUSCH group may include at least a part or all of one or more PUSCH of the semi-persistent CSI and/or one or more semi-statically scheduled PUSCH. When the PUCCH including the UCI conflicts with the dynamically scheduled PUSCH and the eighth PUSCH group in the time domain, the terminal device 1 multiplexes and transmits the UCI on the dynamically scheduled PUSCH. When the PUCCH including the UCI conflicts with the eighth PUSCH group in the time domain, the UCI is multiplexed and transmitted on the PUSCH selected from the eighth PUSCH group.

When the PUCCH including the UCI conflicts with a plurality of PUSCH of the aperiodic CSI in the time domain, and when the plurality of PUSCH of the aperiodic CSI are used for the plurality of serving cells, the terminal device 1 transmits the UCI related to the PUCCH to the PUSCH of the aperiodic CSI to which the serving cell has a low value of the serving cell identifier and transmits the multiplexed UCI. When the plurality of PUSCH of the aperiodic CSI are transmitted in the serving cell, the terminal device 1 multiplexes the UCI related to the PUCCH to the first PUSCH of the aperiodic CSI in the time domain of the plurality of PUSCH of the aperiodic CSI in the serving cell and transmits the multiplexed UCI.

When the PUCCH including the UCI conflicts with a plurality of PUSCH of the semi-persistent CSIs in the time domain, and when the plurality of PUSCH of the semi-persistent CSIs are used for the plurality of serving cells, the terminal device 1 multiplexes the UCI related to the PUCCH to the PUSCH of the semi-persistent CSI to which the serving cell has a low value of the serving cell identifier and transmits the multiplexed UCI. When a plurality PUSCH of the semi-persistent CSI are transmitted in the serving cell, the terminal device 1 multiplexes the UCI related to the PUCCH to the first PUSCH of the semi-persistent CSI in the time domain of the plurality of PUSCH of the semi-persistent CSI in the serving cell and transmits the multiplexed UCI.

When the PUCCH including the UCI conflicts with one or more PUSCH of the aperiodic CSI and/or one or more PUSCH of the semi-persistent CSI and/or one or more dynamically scheduled PUSCH and/or one or more semi-statically scheduled PUSCH in the time domain, a PUSCH for multiplexing and transmitting the UCI related to the PUCCH may be determined based on at least y, c, and l in Equation (1). For example, when the PUCCH including the UCI conflicts with one or more PUSCH of the aperiodic CSI and/or one or more PUSCH of the semi-persistent CSI and/or one or more dynamically scheduled PUSCH and/or one or more semi-statically scheduled PUSCH in the time domain, a PUSCH for multiplexing and transmitting the UCI related to the PUCCH is determined with the priority value $P_{ri_{UCI}}$ obtained based on Equation (1). For example, the terminal device 1 multiplexes the UCI related to the PUCCH on the PUSCH corresponded to the lowest $P_{ri_{UCI}}$ and transmits the multiplexed UCI. That is, when the PUCCH including the UCI conflicts with one or more PUSCH in the time domain, the terminal device 1 multiplexes the UCI related to the PUCCH to the PUSCH corresponding to the lowest $P_{ri_{UCI}}$ of the one or more PUSCH and transmits the multiplexed UCI.

$$P_{ri_{UCI}}(y,c,l)=N_{cells} \cdot N_{time} \cdot y + N_{time} \cdot c + l \qquad [\text{Equation 1}]$$

$N_{cells}$ is the maximum number of serving cells. $N_{cells}$ may be obtained with the higher layer parameter maxNrofServingCells. $N_{cells}$ may also be a predetermined value (for example, 16 or 32).

$N_{time}$ may be a value related to the number of time domain resource allocation candidates of a PUSCH that can be transmitted in one slot. For example, $N_{time}$ may be obtained based on the higher layer parameters. For example, $N_{time}$ may correspond to $N^{slot}_{symb}$. $N^{slot}_{symb}$ is the number of OFDM symbols included in one slot. In the carrier aggregation in which the subcarrier spacing configuration μ is configured for each of the plurality of carriers, $N^{slot}_{symb}$ may correspond to the carrier that is configured with the largest subcarrier spacing configuration μ. In the carrier aggregation in which the subcarrier spacing configuration μ is configured for each of the plurality of carriers, $N^{slot}_{symb}$ corresponds to the carrier that is configured with the largest subcarrier spacing configuration μ among the one or a plurality of carriers of PUSCH, which conflict with the PUCCH including the UCI transmitted (allocated) in the time domain. When the largest subcarrier spacing configuration μ is 2 and the CP configuration is an extended CP (extended cyclic prefix), $N^{slot}_{symb}$ is obtained with the $N^{slot}_{symb}$ for the carrier when the subcarrier spacing configuration μ is 2 and the CP configuration is a normal CP (normal cyclic prefix). For example, $N_{time}$ may correspond to ceiling (K·$N^{slot}_{symb}$). The value of K may be obtained based at least on μ. The value of K may be obtained by $2^{(\mu-\mu PUCCH)}$. μPUCCH is the subcarrier spacing configuration of a carrier in which PUCCH is used. ceiling indicates a ceiling function. The ceiling function outputs the smallest integer that is greater than an input value.

For example, when μ=3 and μPUCCH=1 are configured, K=4, $N^{slot}_{symb}$=14, and $N_{time}$=56.

When μ=0 and μPUCCH=2 are configured and the CP configuration of the carrier using the PUCCH is an extended CP, K=0.25 and $N^{slot}_{symb}$=14, and $N_{time}$=4.

When μ=2 and μPUCCH=4 are configured and the CP configuration of the carrier using the PUSCH for μ=2 is an extended CP, K=0.25 and $N^{slot}_{symb}$=14, and $N_{time}$=4 c is the index of the serving cell (c=0, 1, . . . , $N_{cells}$−1).

In the fourth example in FIG. 6, c=1 may be configured for PUSCH 632 and PUSCH 633, and c=0 may be configured for PUSCH 630 and PUSCH 631.

l may be indexed in the order from the earliest starting position of PUSCH transmission in each of the serving cells. l may correspond to the index of the first OFDM symbol of the PUSCH.

In the third example in FIG. 6, l=0 may be configured for PUSCH 622, l=1 may be configured for PUSCH 623, l=2 may be configured for PUSCH 624, l=3 may be configured for PUSCH 620, and l=4 may be configured for PUSCH 621.

In the fourth example in FIG. 6, l=0 may be configured for the PUSCH 632, l=1 may be configured for the PUSCH 633, l=0 may be configured for the PUSCH 630, and l=1 may be configured for the PUSCH 631.

y is a weighting coefficient used for determining a priority of types of PUSCH that include at least a PUSCH of the aperiodic CSI, a PUSCH of the semi-persistent CSI, a dynamically scheduled PUSCH, and a semi-statically scheduled PUSCH. The value of y may be configured for each PUSCH type.

For example, y=0 may be configured for a PUSCH of the semi-persistent CSI, y=1 may be configured for a PUSCH of the aperiodic CSI, y=2 may be configured for a dynamically scheduled PUSCH, y=3 may be configured for a semi-statically scheduled PUSCH.

In another example, y=1 may be configured for a PUSCH of the semi-permanent CSI, y=0 may be configured for a PUSCH of the aperiodic CSI, y=2 may be configured for a dynamically scheduled PUSCH, and y=3 may be configured for a semi-statically scheduled PUSCH.

In one example, y=2 may be configured for PUSCH of the semi-permanent CSI, y=0 may be configured for PUSCH of the aperiodic CSI, y=1 may be configured for a dynamically scheduled PUSCH, and y=3 may be configured for a semi-statically scheduled PUSCH.

In one example, y=3 may be configured for PUSCH of the semi-permanent CSI, y=0 may be configured for PUSCH of the aperiodic CSI, y=1 may be configured for a dynamically scheduled PUSCH, and y=2 may be configured for a semi-statically scheduled PUSCH.

A first aspect of the present disclosure is a terminal device, comprising: a receiving unit that receives a PDCCH and receives a PDSCH scheduled based on at least the PDCCH, wherein when the PUCCH conflicts with one or more PUSCH in a time domain, one PUSCH is selected from the one or more PUSCH based on at least whether each of the one or more PUSCH is a PUSCH of semi-persistent CSI, and a UCI corresponded to the PDSCH is transmitted on the selected PUSCH.

(A second aspect of the present disclosure is a base station device, comprising: a transmission unit that transmits a PDCCH and transmits a PDSCH scheduled based on at least the PDCCH, wherein when the PUCCH conflicts with one or more PUSCH in a time domain, one PUSCH is selected from the one or more PUSCH based on at least whether each of the one or more PUSCH is a PUSCH of the semi-persistent CSI, and a UCI corresponded to the PDSCH is received on the selected PUSCH.

The program operating on the base station device 3 and the terminal device 1 according to the present disclosure controls programs like a CPU (Central Processing Unit) or the like to realize the functions of the disclosed implementations (programs that cause the computer to function). Furthermore, the information processed by the devices is temporarily stored in a RANI (Random Access Memory) at the time of processing, and thereafter stored in various ROM (Read Only Memory), such as a Flash ROM, or an HDD (Hard Disk Drive), which may be read, corrected and written by the CPU as necessary.

Furthermore, a part of the terminal device 1 or the base station device 3 in the disclosed implementations may be realized by a computer. A program for realizing the control functions may be recorded on a computer-readable recording medium, and the program recorded on the recording medium may be read by a computer system and executed for realizing the functions.

Furthermore, the disclosed "computer system" is a computer system built in the terminal device 1 or the base station device 3 and includes an operating system (OS) and hardware such as peripheral devices. The "computer-readable recording medium" refers to a portable medium such as a flexible disk, an optical disk, a ROM, and a CD-ROM, and a storage device such as a hard disk built in a computer system.

Furthermore, the "computer-readable recording medium" may include a medium that dynamically stores the program for a short time, such as a communication line for transmitting the program through a network, such as the Internet or a communication line such as a telephone line, a server, a medium storing a program for a certain period of time, such as a volatile memory in a computer system at a client end. Furthermore, the program may be a program for realizing a part of the disclosed functions, and may be a program capable of realizing the disclosed functions in combination with a program already recorded in a computer system The base station device 3 in the disclosed implementations can also be realized as a set of a plurality of devices (device group). Each of the devices included in the device group may include a part or all of each disclosed function or each disclosed functional block of the base station device 3. The device group may need to include each function or each function block of the base station device 3. Furthermore, the disclosed terminal device 1 can also communicate with the base station device as a set.

Furthermore, the disclosed base station device 3 may be a EUTRAN (Evolved Universal Terrestrial Radio Access Network) and/or an NG-RAN (NextGen RAN, NR RAN). Furthermore, the disclosed base station device 3 may have some or all of the functions of the higher node for the eNodeB and/or gNB.

Furthermore, a part or all of the disclosed terminal device 1 and disclosed base station device 3 may be realized as a large Scale Integration (LSI) of an integrated circuit, or as a chipset. Each functional block of the terminal device 1 and the base station device 3 may be individually formed into a single chip, or a part or all may be integrated and formed into a chip. Furthermore, the method of circuit integration is not limited to LSI, and may be realized by a dedicated circuit or a general-purpose processor. Furthermore, in the case when a technology for forming an integrated circuit that replaces the LSI is developed from the advanced semiconductor technology, an integrated circuit based on the developed technology may also be used.

Furthermore, in the disclosed implementations, the terminal device is as an example of the communications device. The present disclosure is not limited to the disclosed implementations, and may be applied to fixed or non-mobile electronic equipment installed indoor or outdoor. For example, the electronic equipment may be Audio-Video equipment, kitchen equipment, cleaning equipment, air-conditioner, office equipment, vending machines, other home appliances, terminal devices or communications devices.

The implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A terminal device for performing a communication method, the terminal device comprising:
 a receiver for receiving a Physical Downlink Control Channel (PDCCH) having a first Downlink Control Information (DCI) format; and
 a transmitter for transmitting a Physical Uplink Control Channel (PUCCH) including Uplink Control Information (UCI), and a Physical Uplink Shared Channel (PUSCH), wherein the transmitter:
  multiplexes the UCI onto a first PUSCH dynamically scheduled via the first DCI format when the PUCCH conflicts with a first plurality of PUSCHs including the first PUSCH and a second PUSCH for semi-permanently transmitted Channel State Information (CSI), and multiplexes the UCI onto a third PUSCH for aperiodically transmitted CSI when the PUCCH conflicts with the third PUSCH.

2. The terminal device according to claim 1, wherein, when the PUCCH conflicts with a second plurality of PUSCHs for semi-permanently transmitted CSI transmitted in a plurality of serving cells, the transmitter multiplexes the UCI onto a PUSCH of a cell having a minimum cell index among the second plurality of PUSCHs, wherein the second plurality of PUSCHs include the second PUSCH.

3. The terminal device according to claim 1, wherein:
the aperiodically transmitted CSI is indicated based on a predetermined value configured in a CSI request field included in a second DCI format;
the semi-permanently transmitted CSI is activated when a predetermined value indicating activation of the semi-permanent CSI is set in a predetermined field of a third DCI format, and the third DCI format is scrambled with a Semi Persistent-Channel State Information-Radio Network Temporary Identifier (SP-CSI-RNTI) provided by a higher layer parameter; and
the semi-permanently transmitted CSI is deactivated when a predetermined value indicating deactivation of the semi-permanent CSI is set in a predetermined field of a fourth DCI format, and the fourth DCI format is scrambled with SP-CSI-RNTI provided by the higher layer parameter.

4. The terminal device according to claim 3, wherein the higher layer parameter is sp-csi-RNTI.

5. A base station device for performing a communication method, the base station device comprising:
a transmitter for transmitting a Physical Uplink Downlink Control Channel (PDCCH) having a first Downlink Control Information (DCI) format; and
a receiver for receiving a Physical Uplink Control Channel (PUCCH) including Uplink Control Information (UCI), and a Physical Uplink Shared Channel (PUSCH), wherein the receiver:
multiplexes the UCI onto a first PUSCH dynamically scheduled via the first DCI format when the PUCCH conflicts with a first plurality of PUSCHs including the first PUSCH and a second PUSCH for semi-permanently transmitted Channel State Information (CSI), and
multiplexes the UCI onto a third PUSCH for aperiodically transmitted CSI when the PUCCH conflicts with the third PUSCH.

6. The base station device according to claim 5, wherein, when the PUCCH conflicts with a second plurality of PUSCHs for semi-permanently transmitted CSI transmitted in a plurality of serving cells, the receiver multiplexes the UCI onto a PUSCH of a cell having a minimum cell index among the second plurality of PUSCHs, wherein the second plurality of PUSCHs include the second PUSCH.

7. The base station device according to claim 5, wherein:
the aperiodically transmitted CSI is indicated based on a predetermined value configured in a CSI request field included in a second DCI format;
the semi-permanently transmitted CSI is activated when a predetermined value indicating activation of the semi-permanent CSI is set in a predetermined field of a third DCI format, and the third DCI format is scrambled with a Semi Persistent-Channel State Information-Radio Network Temporary Identifier (SP-CSI-RNTI) provided by a higher layer parameter; and
the semi-permanently transmitted CSI is deactivated when a predetermined value indicating deactivation of the semi-permanent CSI is set in a predetermined field of a fourth DCI format, and the fourth DCI format is scrambled with SP-CSI-RNTI provided by the higher layer parameter.

8. The base station device according to claim 7, wherein the higher layer parameter is sp-csi-RNTI.

9. A communication method for a terminal device, the method comprising:
receiving a Physical Downlink Control Channel (PDCCH) having a first Downlink Control Information (DCI) format;
multiplexing Uplink Control Information (UCI) onto a first Physical Uplink Shared Channel (PUSCH) dynamically scheduled via the first DCI format when a Physical Uplink Control Channel (PUCCH) conflicts with a first plurality of PUSCHs including the first PUSCH and a second PUSCH for semi-permanently transmitted Channel State Information (CSI); and
multiplexing the UCI onto a third PUSCH for aperiodically transmitted CSI when the PUCCH conflicts with the third PUSCH.

10. The communication method according to claim 9, further comprising, when the PUCCH conflicts with a second plurality of PUSCHs for semi-permanently transmitted CSI transmitted in a plurality of serving cells, multiplexing the UCI onto a PUSCH of a cell having a minimum cell index among the second plurality of PUSCHs, wherein the second plurality of PUSCHs include the second PUSCH.

11. The communication method according to claim 9, wherein:
the aperiodically transmitted CSI is indicated based on a predetermined value configured in a CSI request field included in a second DCI format;
the semi-permanently transmitted CSI is activated when a predetermined value indicating activation of the semi-permanent CSI is set in a predetermined field of a third DCI format, and the third DCI format is scrambled with a Semi Persistent-Channel State Information-Radio Network Temporary Identifier (SP-CSI-RNTI) provided by a higher layer parameter; and
the semi-permanently transmitted CSI is deactivated when a predetermined value indicating deactivation of the semi-permanent CSI is set in a predetermined field of a fourth DCI format, and the fourth DCI format is scrambled with SP-CSI-RNTI provided by the higher layer parameter.

12. The communication method according to claim 11, wherein the higher layer parameter is sp-csi-RNTI.

* * * * *